United States Patent
Inaguma et al.

[11] Patent Number: 6,071,013
[45] Date of Patent: Jun. 6, 2000

[54] HYDRAULIC BEARING DEVICE

[75] Inventors: Yoshiharu Inaguma, Nagoya; Kazuhisa Sugiyama, Okazaki, both of Japan

[73] Assignee: Toyoda Koki Kabushiki Kaisha, Kariya, Japan

[21] Appl. No.: 09/040,927

[22] Filed: Mar. 19, 1998

[30] Foreign Application Priority Data

Mar. 19, 1997 [JP] Japan ................................ 9-084622

[51] Int. Cl.$^7$ ................................................. F16C 32/06
[52] U.S. Cl. ........................................... 384/103; 384/100
[58] Field of Search ................................. 384/100, 103, 384/114, 117, 118, 120, 107, 111, 113

[56] References Cited

U.S. PATENT DOCUMENTS

| | | |
|---|---|---|
| 3,386,783 | 6/1968 | Scheufler et al. . |
| 4,285,551 | 8/1981 | Suzuki et al. . |
| 4,307,918 | 12/1981 | Mobsin et al. . |
| 4,325,585 | 4/1982 | Sugita . |
| 4,426,118 | 1/1984 | Mohsin . |
| 4,474,483 | 10/1984 | Suzuki et al. . |
| 5,449,236 | 9/1995 | Hori et al. . |
| 5,503,479 | 4/1996 | Ide . |
| 5,513,917 | 5/1996 | Ide et al. .................. 384/100 |
| 5,743,654 | 4/1998 | Ide et al. .................. 384/100 |

FOREIGN PATENT DOCUMENTS

| | | |
|---|---|---|
| 0 005 624 | 11/1979 | European Pat. Off. . |
| 0 007 409 | 2/1980 | European Pat. Off. . |
| 55-10169 | 1/1980 | Japan . |
| 6-50341 | 2/1994 | Japan . |
| 829 482 | 3/1960 | United Kingdom . |
| WO 95/16863 | 6/1995 | WIPO . |

*Primary Examiner*—David A. Bucci
*Assistant Examiner*—Brandon C. Stallman
*Attorney, Agent, or Firm*—Oblon, Spivak, McClelland, Maier & Neustadt, P.C.

[57] ABSTRACT

A hydraulic bearing device includes a cylindrical bearing metal, a groove-like pocket, a dynamic pressure generation land, a fluid flowing space and an oil supply hole. The cylindrical bearing metal supports a rotating shaft. The pocket is formed in an inner peripheral surface of the bearing metal. The pocket defines the dynamic pressure generation land. The fluid flowing space is formed in the dynamic pressure generation land. The oil supply hole supplies fluid from a fluid pressure source to the pocket and the fluid flowing space.

The dynamic pressure generation land which has been heated due to fluid friction is cooled by the fluid passing through the fluid flowing space formed in the dynamic pressure generation land. It is thus possible to inhibit thermal expansion of the hydraulic bearing device, especially the dynamic pressure generation land.

6 Claims, 9 Drawing Sheets

(a)   (b)

(a)  (b)

HYDRAULIC BEARING DEVICE

INCORPORATION BY REFERENCE

The entire disclosure of Japanese Patent Application No. HEI 9-84622 filed on Mar. 19, 1997 including specification, drawings and abstract is incorporated herein by reference in its entirety.

BACKGROUND OF THE INVENTION

1. Field of the Invention

The present invention relates to a hydraulic bearing device that is mounted, for example, on a main spindle of a machine tool.

2. Description of the Related Art

As illustrated in FIG. 1, a previously employed hydraulic bearing device to be mounted on a main spindle of a machine tool or the like is provided with a bearing metal 30. Referring to rig. 1, a substantially U-shaped groove 31 is formed in a bearing surface of the bearing metal 30 which supports a rotating shaft such as the main spindle of the machine tool. An oil supply hole 8 having a throttle nozzle opens to a bottom surface of the substantially U-shaped groove 31. The substantially U-shaped groove 31 is composed of a connecting portion 31a that extends in an axial direction of the rotating shaft, and log portions 31b that extend from respective ends of the connecting portion 31a in the circumferential direction in which the rotating shaft rotates. Drainage grooves 32 extending parallel to the leg portions 31b are formed in the bearing metal 30, so that the substantially U-shaped groove 31 is interposed between the drainage grooves 32. A quadrilateral bearing surface area surrounded by the substantially U-shaped groove 31 constitutes a dynamic pressure generation land 6.

In the aforementioned bearing metal 30, lubricating oil in the oil supply hole 8 undergoes a pressure reduction process provided by the throttle nozzle and flows into the substantially U-shaped groove 31, thus filling up a space defined by the substantially U-shaped groove 31 and an outer peripheral surface of the rotating shaft. The lubricating oil then flows through a narrow gap formed between a bearing surface area and the outer peripheral surface of the rotating shaft into the drainage grooves 32 and is drained to the outside. Therefore, the hydraulic bearing device with the bearing metal 30 functions as a static fluid bearing.

Since the diameter of the rotating shaft is smaller than the inner diameter of the bearing metal 30 having the dynamic pressure generation land 6, a bearing clearance is formed between a bearing surface of the dynamic pressure generation land 6 and the outer peripheral surface of the rotating shaft. The lubricating oil that has filled up the space defined by the substantially U-shaped groove 31 and the outer peripheral surface of the rotating shaft remains in the bearing clearance. When the rotating shaft rotates, a dynamic pressure is generated due to a wedge effect of the lubricating oil remaining in the bearing clearance formed between the bearing surface of the dynamic pressure generation land 6 and the outer peripheral surface of the rotating shaft. A a result, the hydraulic bearing device with the bearing metal 30 also functions as a dynamic fluid bearing.

Recently, machine tools adopt a main spindle that rotates at a high speed. In the aforementioned previously employed hydraulic bearing device, if the rotating shaft rotates at a high speed, the dynamic pressure generation land 6 is subjected to a great heat generated by the lubricating oil due to fluid friction. Consequently, the bearing metal 30 thermally expands. Because an outer side of the bearing metal 30 is fixed, the inner diameter of the bearing metal 30 decreases and the bearing clearance formed the dynamic pressure generation land 6 and the rotating shaft decreases correspondingly due to the thermal expansion. As a result, the dynamic pressure generation land 6 is further subjected to a greater heat generated by the lubricating oil.

Then, the bearing metal 30 thermally expands further and the bearing clearance decreases, so that the lubricating oil generates an even greater heat. This results in a vicious circle.

Continuation of such a vicious circle leads to deterioration of bearing performance and possible seizure of the bearing metal 30 with the rotating shaft.

In order to prevent deterioration of the bearing performance as well as seizure of the bearing metal 30, the surface area of the dynamic pressure generation land 6 may be reduced or the bearing clearance may be increased. In this case, however, the dynamic pressure applied to the lubricating oil by the dynamic pressure generation land 6 decreases, so that bearing load characteristics may be adversely affected.

In the case where the rotating shaft rotates at a comparatively high speed, the demand for an increase in dynamic pressure supporting rigidity as well an dynamic pressure conflicts with the demand for a decrease in excessive heat generation in the vicinity of the dynamic pressure generation land 6.

SUMMARY OF THE INVENTION

It is an object of the present invention to provide a hydraulic bearing device that allows a rotating shaft to rotate at a comparatively high speed and curbs thermal expansion as well as heat generation.

A hydraulic bearing device according to the present invention includes a cylindrical bearing metal, a groove-like pocket, a dynamic pressure generation land, a fluid flowing space and an oil supply hole. The cylindrical bearing metal supports a rotating shaft. The pocket is formed in an inner peripheral surface of the bearing metal. The pocket defines the dynamic pressure generation land. The fluid flowing space is formed in the dynamic pressure generation land. The oil supply hole supplies fluid from a fluid pressure source to the pocket and the fluid flowing space.

Because the hydraulic bearing device according to the present invention is provided with the pocket and the dynamic pressure generation land, it functions not only as a static fluid bearing but also as a dynamic fluid bearing.

The dynamic pressure generation land which has been heated due to fluid friction is cooled by fluid passing through the fluid flowing space formed in the dynamic pressure generation land.

It is thus possible to inhibit thermal expansion of the hydraulic bearing device, especially the dynamic pressure generation land. In the case where the dynamic pressure generation land has a relatively large area in order to ensure effective utilization of the dynamic pressure, it may generate a great heat. However, the fluid flowing space is also capable of being large enough to nullify the heat thus generated, so that the dynamic pressure generation land is cooled sufficiently by the fluid without causing any problem.

Hence, it is possible to prevent a vicious circle wherein the bearing metal thermally expands due to fluid friction, a bearing clearance between the dynamic pressure generation land and the rotating shaft decreases due to thermal expansion of the bearing metal, the fluid generates a greater heat and the bearing metal thermally expands further due to fluid friction. Thereby, deterioration of bearing performance as well as possible seizure of the bearing metal with the rotating shaft is prevented. As a result, the hydraulic bearing device allows the rotating shaft to rotate at a comparatively high speed.

According to a preferred construction of the hydraulic bearing device wherein the fluid flowing space in the dynamic pressure generation land is formed by grooves or passages, the rigidity of the dynamic pressure generation land is enhanced.

Moreover, the drainage land to which the drainage hole opens improves load characteristics of the hydraulic bearing device.

In the case where the hydraulic bearing device has a clearance-increasing portion in the dynamic pressure generation land, a clearance between the dynamic pressure generation land and the rotating shaft is increased. Especially, the clearance is formed in a section of the dynamic pressure generation land located most upstream in the direction in which the outer peripheral surface of the rotating shaft moves. Therefore, a characteristic of the hydraulic bearing device as the dynamic fluid bearing is enhanced.

In the case where the bearing metal has a double layer construction achieved by tightly fitting the inner sleeve into the bearing casing, the pocket and the fluid flowing space is formed easily by machining only the outer peripheral surface of the inner sleeve. This enhances productivity and reduces production costs significantly.

Furthermore, even if the bearing metal is made of a single member, the fluid flowing space in the dynamic pressure generation land can be formed easily by communication holes extending from an end surface of the bearing metal and the plugs. Because the hydraulic bearing device thus constructed does not have a double layer construction achieved by fitting one maybe into the other, it exhibits high rigidity as well an great capacity for cooling the dynamic pressure generation land.

BRIEF DESCRIPTION OF THE DRAWINGS

Further objects, features and advantages of the present invention will become apparent from the following description of the preferred embodiments with reference to the accompanying drawings, wherein.

DESCRIPTION OF PREFERRED EMBODIMENTS

[First embodiment]

Figure 2:
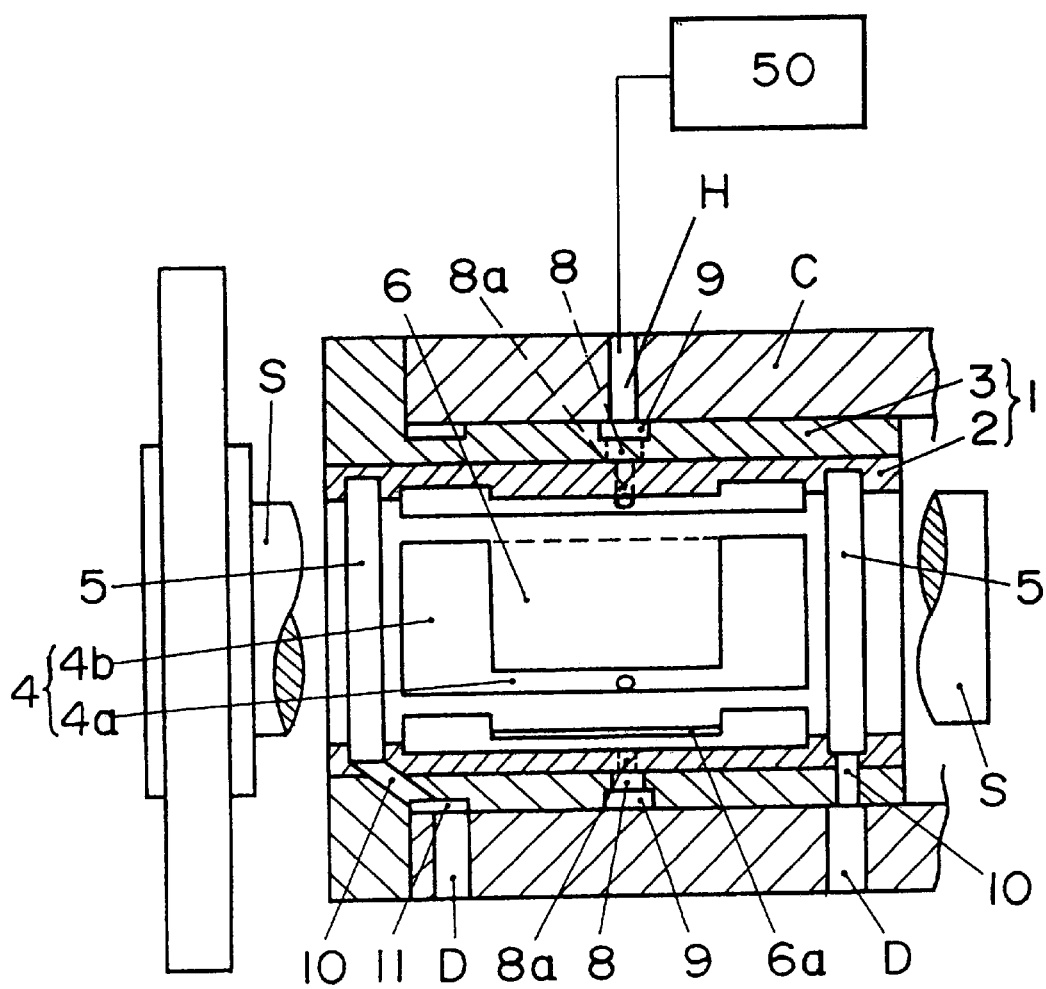
FIG. 2 is a sectional view of a main spindle of a grinding machine that in provided with a hydraulic bearing device according to an embodiment of the present invention.

Preferred embodiments of a hydraulic bearing device according to the present invention will be described hereinafter with reference to the accompanying drawings. The hydraulic bearing device according to the present invention is employed, for instance, in a wheel spindle of a grinding machine as illustrated in FIG. 2. A main spindle casing C is provided with the hydraulic bearing device for rotatably supporting an outer peripheral surface of the wheel spindle, that is, a rotating shaft S.

A hydraulic bearing device according to a first embodiment of the present invention will be described.

The hydraulic bearing device as illustrated in FIG. 2 has a bearing metal 1 that is composed of an inner sleeve 2 and a bearing casing 3. The inner sleeve 2 is formed in a cylindrical shape and rotatably supports the outer peripheral surface of the rotating shaft S. The inner sleeve 2 is press-fitted or shrinkage-fitted into the bearing casing 3 which is also formed in a cylindrical shape.

Figure 3:
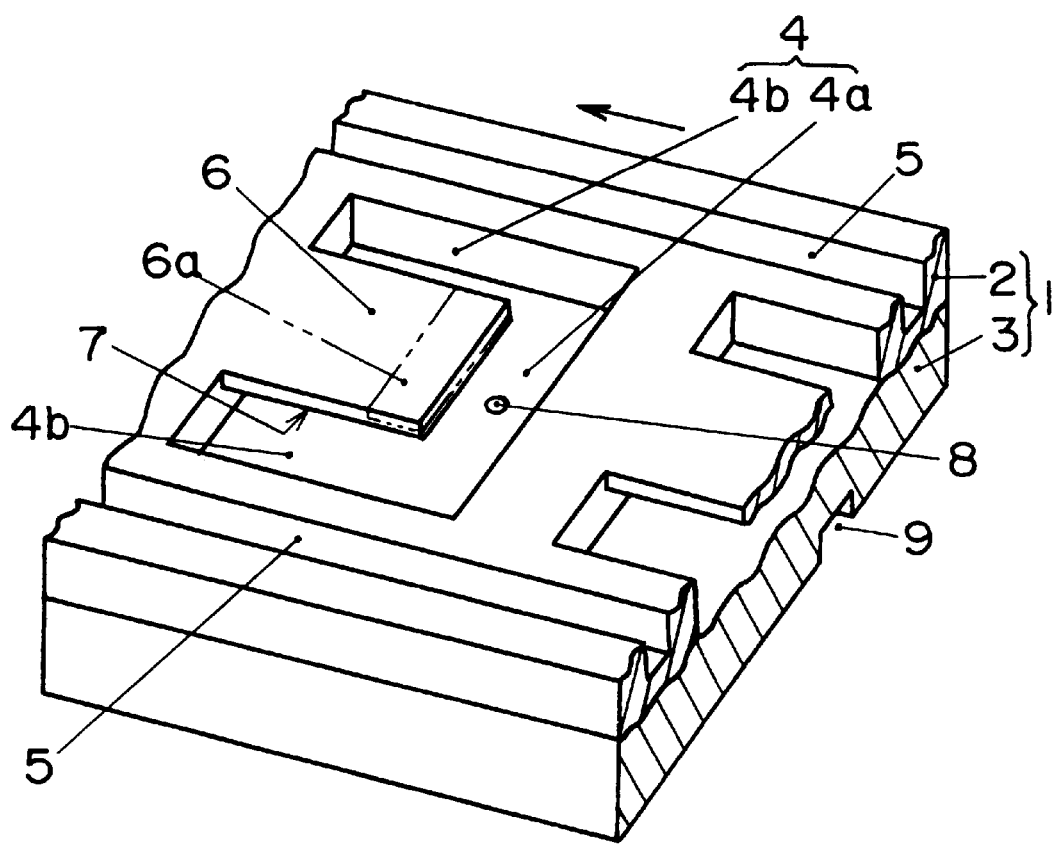
FIG. 3 is a partial perspective view of a bearing metal of the hydraulic bearing device according to a first embodiment of the present invention.
Figure 4:
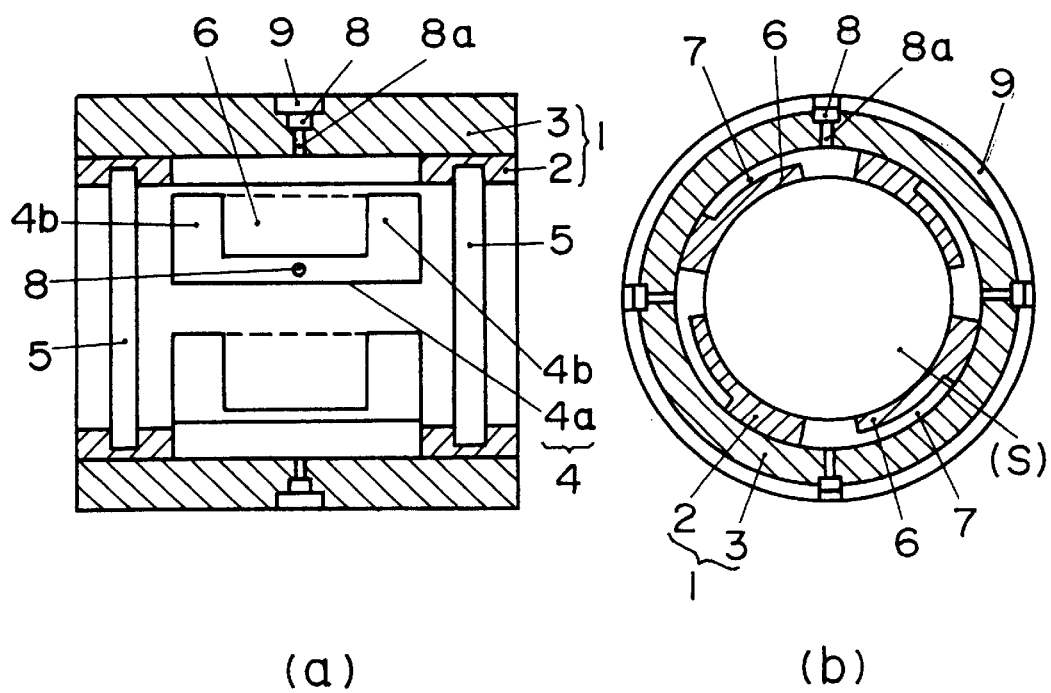
FIGS. 4(a) and 4(b) are longitudinal and cross sectional views of the bearing metal of the hydraulic bearing device according to the first embodiment of the present invention respectively.

Referring to FIG. 3, the inner sleeve 2 is provided with an appropriate number of substantially U-shaped slots 4 penetrating the inner sleeve 2, the slots 4 being arranged in a circumferential direction and equally distant from each other. The number of the slots 4 illustrated in FIG. 4 is four. Each of the slots 4 is composed of a connecting portion 4a that extends in an axial direction of the rotating shaft S and leg portions (parallel portions) 4b that extend from respective ends of the connecting portion 4a in the circumferential direction in which the rotating shaft S rotates. The slot 4 is formed as a substantially U-shaped oil pocket by the connecting portion 4a and leg portions 4b. Furthermore, drainage grooves 5 are formed in an inner peripheral surface of the inner sleeve 2. The substantially U-shaped slot 4 is formed between the drainage grooves 5, which extend in the circumferential direction in parallel with the leg portions 4b.

A quadrilateral bearing surface area surrounded by the substantially U-shaped slot 4 constitutes a dynamic pressure generation land 6. A portion of the inner sleeve 2 corresponding to the dynamic pressure generation land 6 is cut off to a certain depth from the side of the outer peripheral surface of the inner sleeve 2. The dynamic pressure generation land 6 is thinner than the inner sleeve 2 and located on the same level as the inner peripheral surface of the inner sleeve 2. Therefore, the dynamic pressure generation land 6 is formed in a plate shape like a visor whose one side is supported by the inner peripheral surface of the inner sleeve 2.

When the cylindrical inner sleeve 2 is tightly fitted into the bearing casing 3, the substantially U-shaped slot 4 forms a substantially U-shaped groove whose bottom surface is an inner peripheral surface of the bearing casing 3. Formed between the dynamic pressure generation land 6 and the inner peripheral surface of the bearing casing 3 is a fluid flowing space 7 that communicates with the substantially U-shaped groove of the substantially U-shaped slot 4. That is, the visor-like dynamic pressure generation land 6, which is located on the same level as the inner peripheral surface of the inner surface 2, projects into a quadrilateral slot portion including the substantially U-shaped slat 4 in a peripheral direction of the inner sleeve 2. Therefore, the thickness of the inner sleeve 2 equals the sum of the thickness of the visor-like dynamic pressure generation land 6 and the thickness of the fluid flowing space 7 (see FIGS. 3, 4(b)).

Figure 1:
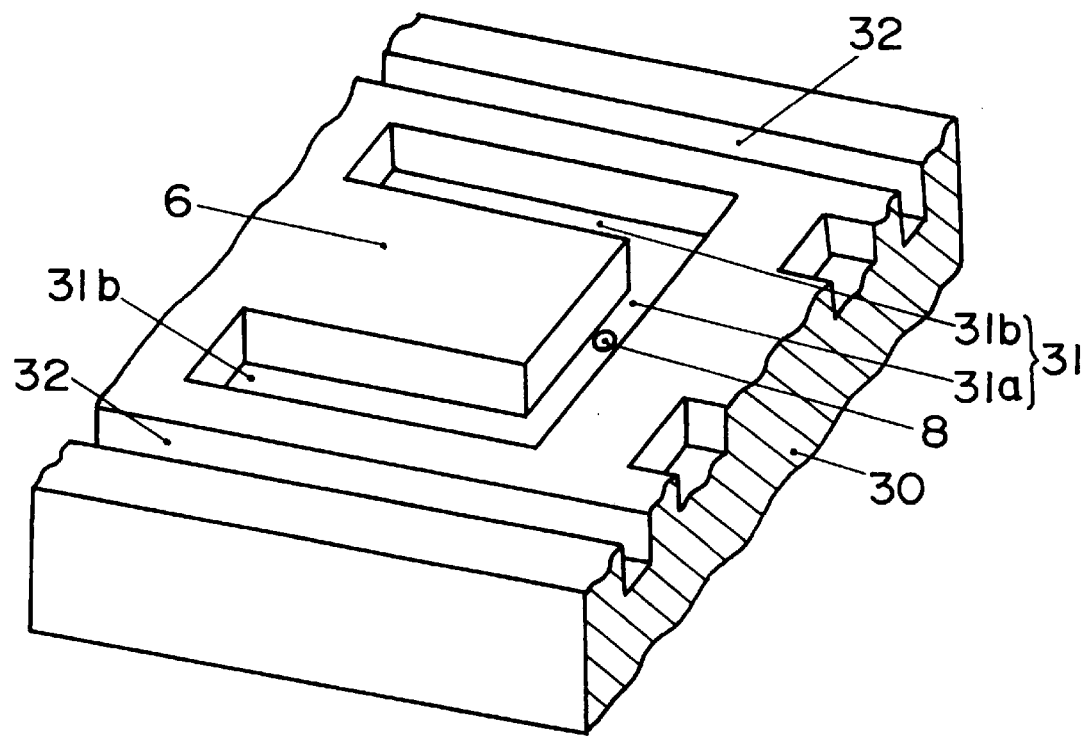
FIG. 1 is a partial perspective view of a bearing metal of a previously employed hydraulic bearing device.

As illustrated in FIGS. 2 and 4(a), an oil supply hole 8 is formed in the bearing casing 3. The oil supply hole 8 extends radially in the bearing casing 3 and in provided with a throttle nozzle 8a. One end of the oil supply hole 8 opens to the inner peripheral surface of the bearing metal 1 formed by fitting the inner sleeve 2 into the bearing casing 3. The opening of the oil supply hole 8 in the inner peripheral surface is located on the bottom surface of the substantially U-shaped groove or on an area facing the fluid flowing space 7. Referring to the drawings, the oil supply hole 8 opens to the connecting portion 4a of the substantially U-shaped slot 4 at a center thereof. The other end of the oil supply hole 8 opens to a bottom surface of a peripheral groove 9 that is formed in an outer peripheral surface of the bearing casing 3. The oil supply hole 8 is connected via an oil supply hole a of the main spindle casing C with a hydraulic pressure source 50 provided outside as shown in FIG. 1.

In addition, the bearing metal 1, including the inner sleeve 2 fitted into the bearing casing 3, has drainage passages 10. In each of the drainage passages 10, one end of the drainage passage 10 communicates with a bottom surface of the drainage groove 5. The other end of the drainage passage 10 communicates with a main drainage passage D of the main spindle casing C either directly or through a drainage groove 11 formed in the outer peripheral surface of the bearing casing 3. The main drainage passage D communicates with an oil terminal (not shown) provided outside.

A free end portion of the visor-like dynamic pressure generation land 6 as indicated by an alternate long and two short dashes line in FIG. 3 may be cut off from the side of the inner peripheral surface of the inner sleeve 2 in order to form a stepped portion 6a. This stepped portion 6a may be referred to as a clearance-increasing portion. Instead of forming the stepped portion 6a, the visor-like dynamic pressure generation land 6 may be reduced in thickness gradually toward the free end portion thereof to form a taper portion.

In the aforementioned bearing metal 1, lubricating oil is supplied from the hydraulic pressure source 50 provided outside to the peripheral groove 9 through communication means such as the oil supply hole H formed in the main spindle casing C. The lubricating oil reaches the oil supply hole 8 after the lubricating oil undergoes a pressure reduction process provided by the throttle nozzle 8a. And the lubricating oil flows into the substantially U-shaped slot 4 which serves as an oil pocket either directly or through the fluid flowing space 7, thus filling up a space defined by the substantially U-shaped slot 4 and the outer peripheral surface of the rotating shaft S. Then, the lubricating oil flows into the drainage grooves 5 through a narrow gap formed between the dynamic pressure generation land 6 and the outer peripheral surface of the rotating shaft S. Finally, the lubricating oil is drained into the oil terminal (not shown) provided outside through communication means such an the drainage passage 10, drainage groove 11 and the main drainage passage D. The hydraulic bearing device functions as a static fluid bearing by the operation of the lubricating oil described above.

Since the diameter of the rotating shaft S is smaller than that of the bearing metal 1 having the dynamic pressure generation land 6, a gap is formed between a bearing surface of the dynamic pressure generation land 6 and the outer peripheral surface of the rotating shaft S. The lubricating oil that has filled up the space defined by the substantially U-shaped slot 4 and the outer peripheral surface of the rotating shaft S remains in the gap. When the rotating shaft S rotates, a dynamic pressure is generated due to a wedge effect of the lubricating oil remaining in the gap formed between the bearing surface of the dynamic pressure generation land 6 and the outer peripheral surface of the rotating shaft S. As a result, The hydraulic bearing device also functions as a dynamic fluid bearing.

As described above, the visor-like dynamic pressure generation land 6 may have the thin stepped portion 6a or the taper portion in the free end portion thereof. In this case, when the rotating shaft S rotates such that the outer peripheral surface of the inner sleeve 2 moves from the free end portion to a base portion of the dynamic pressure generation land 6 as indicated by an arrow in FIG. 3, the wedge effect of the lubricating oil is further strengthened. Consequently, the dynamic pressure generated can be utilized more advantageously.

The lubricating oil supplied from the oil supply hole 8 is drained into the drainage grooves 5 through the gap and the substantially U-shaped slot 4. The lubricating oil is also drained into the drainage grooves 5 through the fluid flowing space 7 formed between the dynamic pressure generation land 6 and the inner peripheral surface of the bearing casing 3. Although the dynamic pressure generation land 6 is heated due to fluid friction in the gap between the dynamic pressure generation land 6 and the outer peripheral surface of the rotating shaft S, a back surface of the dynamic pressure generation land 6 is cooled by the lubricating oil flowing through the fluid flowing space 7. It is thus possible to inhibit thermal expansion of the bearing metal 1, especially, that of the dynamic pressure generation land 6.

In the case where the dynamic pressure generation land 6 has a relatively large area in order to ensure effective utilization of the dynamic pressure, it may generate a great heat. However, the back surface of the dynamic pressure generation land 6 is also capable of being large enough to nullify the heat thus generated, so that the dynamic pressure generation land 6 is cooled sufficiently by the lubricating oil without causing any problem.

The fluid flowing space 7 is formed by cutting off the portion of the inner sleeve 2 corresponding to the dynamic pressure generation land 6 to a certain depth from the side of the outer peripheral surface thereof and tightly fitting the inner sleeve 2 into the bearing casing 3. Therefore, the forming process can be performed quite easily.

The drainage groove 5 is formed by cutting the inner peripheral surface of the inner sleeve 2. Though the substantially U-shaped oil pocket can be formed in the similar way, the oil pocket is formed by radially making the substantially U-shaped slot 4 from the side of the outer peripheral surface of the inner sleeve 2. The reason is that making a slot from the outside is much easier than forming the pocket from the inside, since the substantially U-shaped oil pocket includes the connecting portion 4a not extending in the circumferential direction. The portion not extending in the circumferential direction is difficult to be formed by turning, milling and the like. It is therefore concluded that the substantially U-shaped oil pocket is formed just as easily as the fluid flowing space 7.

[Second embodiment]

A hydraulic bearing device according to a second embodiment of the present invention will now be described.

This hydraulic bearing device is constructed in the same manner as the hydraulic bearing device of the first embodiment except for the position of the oil supply hole 8, the shape of the leg portion 4b and the shape of those portions relating to drainage of lubricating oil. In the second embodiment, the oil supply hole 8 opens inevitably to the connecting portion 4a of the substantially U-shaped slot 4 (e.g. to a center of the connecting portion 4a as illustrated in the drawings).

Figure 5:
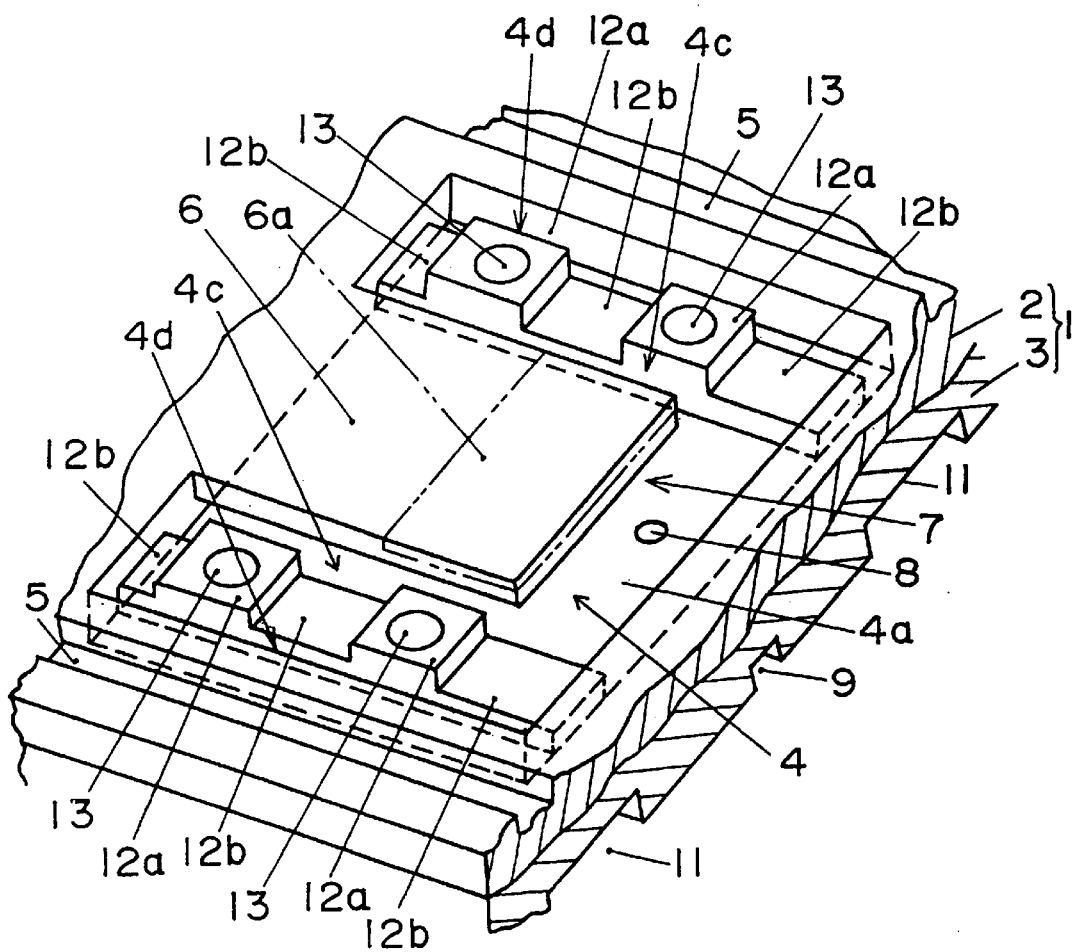
FIG. 5 is a partial perspective view of a bearing metal of a hydraulic bearing device according to a second embodiment of the present invention.

As illustrated in FIG. 5, each leg portion of the substantially U-shaped slot 4 is composed of a first leg portion 4c connected with both ends of the connecting portion 4a and a second leg portion 4d formed separately from and extends parallel to the first leg portion 4c. The second leg portion 4d is located outward of the first leg portion 4c with respect to an axis of the rotating shaft S. A strip portion of the inner sleeve 2 separate. The first leg portion 4c from the second leg portion 4d. And the strip portion of the inner sleeve 2 is composed of drainage lands 12a and connecting portions 12b that are arranged alternately. Each of the drainage lands 12a is as thick as the inner sleeve 2 and provides a bearing surface that in on the same level as the dynamic pressure generation land 6. On the other hand, each of the connecting portions 12b is thinner than the inner sleeve 2 and projects from the outer peripheral surface of the inner sleeve 2.

A drainage hole 13 opens to the bearing surface of the drainage land 12a. The first leg portion 4c and the second leg portion 4d communicate with each other at the connecting portion 12b.

The drainage holes 13 communicate with the drainage grooves 11. The drainage grooves 11 are formed in the outer peripheral surface of the bearing casing 3 and extend in the circumferential direction of the bearing casing 3. Also, the drainage passage 10 opening to the bottom surface of the drainage groove 5 formed in the inner sleeve 2 communicates with the drainage groove 11 (refer to FIG. 2).

In the aforementioned hydraulic bearing device, lubricating oil supplied from the oil supply hole 8 formed in the bearing metal 1 flows into the substantially U-shaped slat 4 which serves as an oil pocket after the lubricating oil undergoes a pressure reduction process provided by the throttle nozzle 8a (refer to FIG. 2). The lubricating oil fills up a space defined by the substantially U-shaped slot 4 and the outer peripheral surface of the rotating shaft S. Then, the lubricating oil flows into the drainage groove 5 through a narrow gap formed between bearing surface of the dynamic pressure generation land 6 and the outer peripheral surface of the rotating shaft S. The lubricating oil also flown into the drainage hole 13 through a narrow gap formed between a bearing surface of the drainage land 12a and the outer peripheral surface of the rotating shaft S. Finally, the lubricating oil in drained into the oil terminal provided outside through the drainage passage 10, the drainage groove 11 and the main drainage passage D.

The hydraulic bearing device thereby functions as a static fluid bearing whose load characteristics are improved due to the drainage land 12a to which the drainage hole 13 opens. In all the other respects, the operation and effect of the second embodiment are substantially identical to those of the first embodiment.

[Third embodiment]

A hydraulic bearing device according to a third embodiment of the present invention will now be described.

This hydraulic bearing device is constructed in the same manner as the hydraulic bearing device of the first embodiment except for the oil supply hole 8 and the fluid flowing space 7 through which lubricating oil flows so as to cool the dynamic pressure generation land 6.

Figure 6:
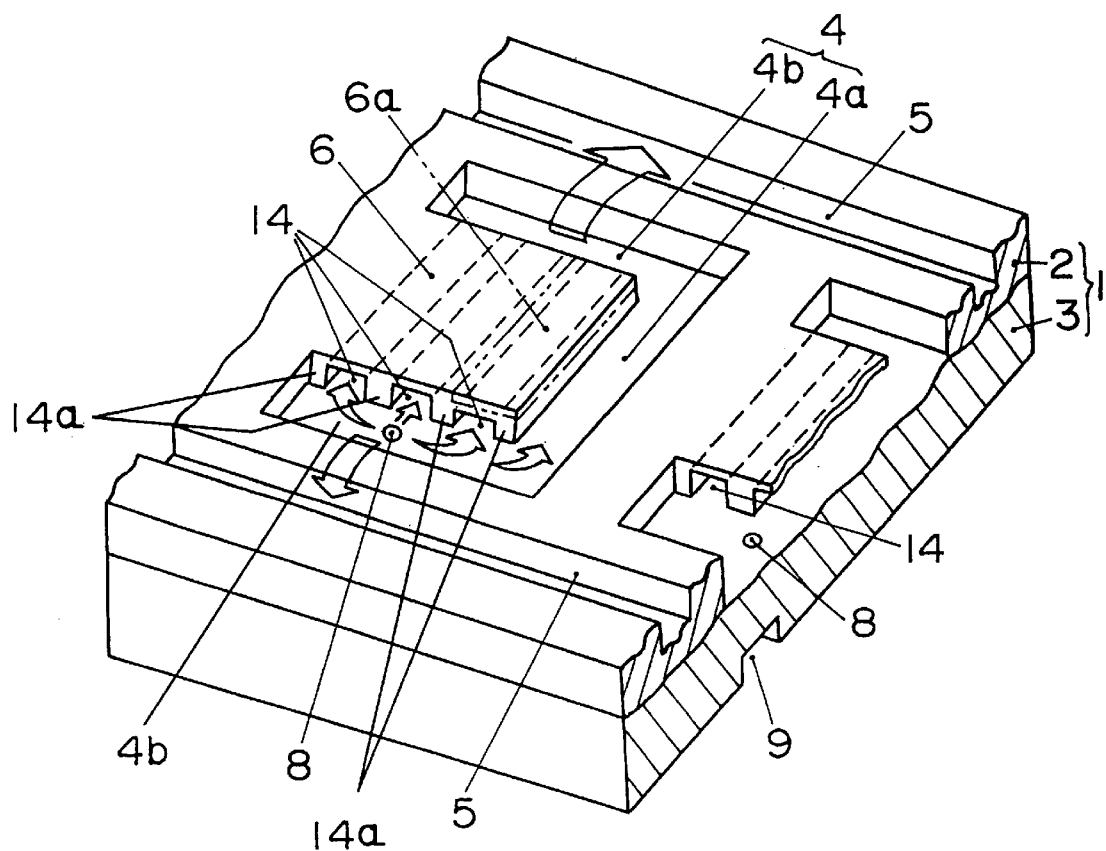
FIG. 6 is a partial perspective view of a bearing metal of a hydraulic bearing device according to a third embodiment of the present invention.
Figure 7:
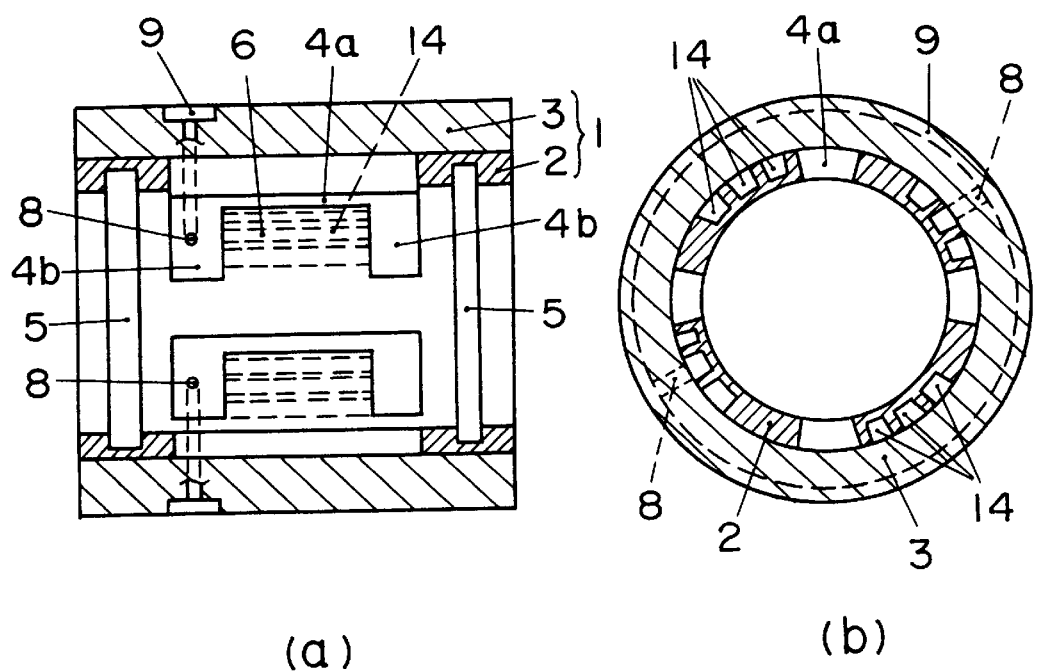
FIGS. 7(a) and 7(b) are longitudinal and cross sectional views of the bearing metal of the hydraulic bearing device according to the third embodiment of the present invention respectively.

As illustrated in FIGS. 6, 7(a) and 7(b), a quadrilateral bearing surface area surrounded by the substantially U-shaped slot 4 constitutes the dynamic pressure generation land 6. Formed in a section of the outer peripheral surface of the inner sleeve 2 corresponding to the dynamic pressure generation land 6 are an appropriate number of communication grooves 14 that connect the leg portions 4b, 4b with each other. Referring to the drawings, the dynamic pressure generation land 6 in provided with three communication grooves 14. The communication grooves 14 extend along the axis of rotation and parallel to each other.

As is the case with the first embodiment, the inner sleeve 2 is fitted into the bearing casing 3, so that the substantially U-shaped slot 4 formed in the inner sleeve 2 constitutes a substantially U-shaped groove whose bottom surface is the inner peripheral surface of the bearing casing 3. Furthermore, each of the communication grooves 14 constitutes together with the inner peripheral surface of the bearing casing 3 a passage through which lubricating oil flows so as to cool the dynamic pressure generation land 6. The passage of the communication groove 14 connects to both the leg portions 4b and extends along the axis of rotation.

The oil supply hole 8, formed in the bearing casing 3 in the same manner as in the first embodiment, opens to an appropriate location corresponding to one of the leg portions 4b of the substantially U-shaped slot 4. Referring to FIG. 6, the oil supply hole 8 opens to one of the leg portions 4b of the substantially U-shaped slot 4 at a location that faces an opening position of the central communication groove 14.

In the aforementioned hydraulic bearing device, the lubricating oil supplied from the oil supply hole 8 to the substantially U-shaped slot 4 which serves as an oil pocket after the lubricating oil undergoes a pressure reduction process provided by the throttle nozzle 8a (refer to FIG. 2). The lubricating oil thus fills up the space defined by the substantially U-shaped slot 4 and the outer peripheral surface of the rotating shaft S. The lubricating oil then flows from one to the other of the log portions 4b through the communication grooves 14, each of which constitutes a passage hole through which the lubricating oil flows so as to cool the dynamic pressure generation land 6. Thereafter, the lubricating oil flows into the drainage grooves 5 through a narrow gap formed between the bearing surface areas of the inner sleeve 2 and the outer peripheral surface of the rotating shaft S. Finally, the lubricating oil is drained into the oil terminal provided outside through the drainage passage 10, the drainage groove 11 and the main drainage passage D.

Because the lubricating oil flows through the communication grooves 14, the dynamic pressure generation land 6 which has been heated due to fluid friction is cooled from the back surface thereof. Hence, the same operation and effect as in the first embodiment can be obtained. This embodiment ensures that the lubricating oil flows from one end to the other of each of the communication grooves 14, thus achieving a better cooling effect than in the first embodiment.

Furthermore, lower supporting portions 14a for supporting the dynamic pressure generation land 6 is formed between the communication grooves 14, so that the dynamic pressure generation land 6 exhibits an enhanced rigidity.

The communication groove 14 is formed by cutting off the dynamic pressure generation land 6 to a certain depth from the side of the outer peripheral surface of the inner sleeve 2 and tightly fitting the inner sleeve 2 into the bearing casing 3. Therefore, the forming process can be performed quite easily. In all the other respects, the operation and effect of the third embodiment are substantially identical to those of the first embodiment.

[Forth embodiment]

A hydraulic bearing device according to a fourth embodiment of the present invention will now be described.

This hydraulic bearing device is constructed in the same manner as that of the third embodiment except for the leg portions 4b of the substantially U-shaped slot 4 and the shape of those portions relating to drainage of lubricating oil.

Figure 8:
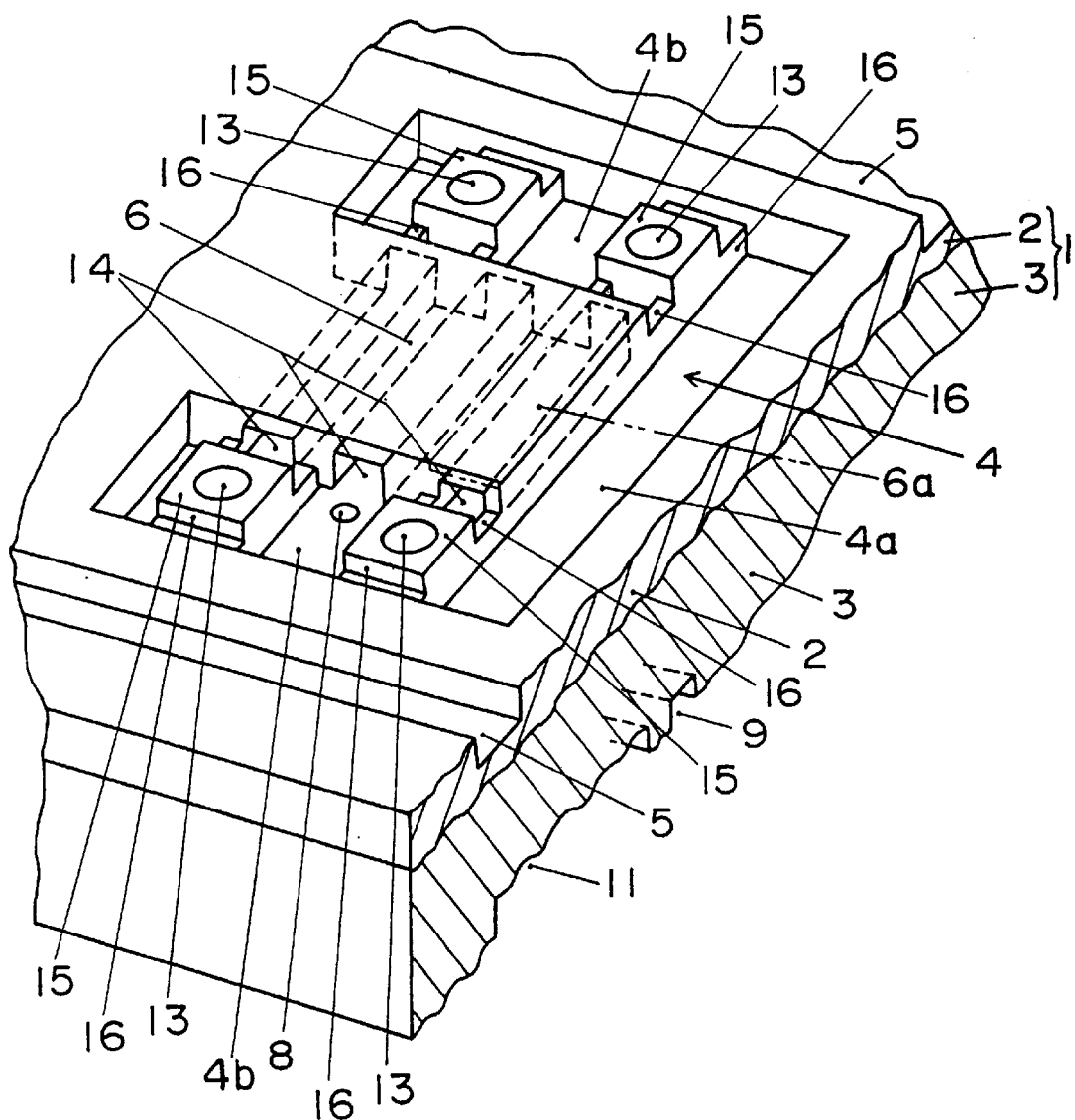
FIG. 8 is a partial perspective view of a bearing metal of a hydraulic bearing device according to a fourth embodiment of the present invention.

As illustrated in FIG. 8, drainage lands 15 are provided in each of the leg portions 4b of the substantially U-shaped slot 4 formed in the inner sleeve 2. Communication grooves 14 are formed in the dynamic pressure generation land 6. Each of the communication grooves 14 alternately faces or does not face the drainage land 15. Each of the drainage lands 15 has a bearing surface that is on the same level as the dynamic pressure generation land 6. Referring to FIG. 8, two outermost ones of the three communication grooves 14 face the drainage lands 15 respectively, whereas the middle one faces nothing but the oil supply hole 8. That is, the leg portion 4b of the substantially U-shaped slot 4 is divided into a plurality of sections (e.g. three sections as illustrated in FIG. 8) by the drainage lands 15.

The drainage hole 13 is formed in the center of the drainage land 15. A side groove 16 that is thinner than the inner sleeve 2 is formed on each side of the drainage land 15. That is, the drainage land 15 is interposed between two side grooves 16. Each end portion of the communication groove 14 reaches the proximal one of the two side grooves 16.

The drainage holes 13 communicate with the drainage grooves 11 which are formed in the outer peripheral surface of the bearing casing 3 and extend in the circumferential direction. Also, the drainage passage 10 opening to the bottom surface of the drainage groove 5 formed in the inner sleeve 2 communicates with the drainage groove 11 (refer to FIG. 2).

The oil supply hole 8 which is formed in the inner peripheral surface of the bearing casing 3 in the same manner as in the third embodiment opens to face the opening position of the communication groove 14 which does not face the drainage land 15.

In the aforementioned hydraulic bearing device, the lubricating oil in directly supplied from the oil supply hole 8 formed in the bearing metal 1 to the central communication groove 14 after the lubricating oil undergoes a pressure reduction process provided by the throttle nozzle 8a (refer to FIG. 2). And the lubricating oil is also supplied to the other communication grooves 14 through the side grooves 16. Furthermore, the lubricating oil fills up the space between the substantially U-shaped slot 4 serving as an oil pocket and the outer peripheral surface of the rotating shaft S.

The lubricating oil flowing through the communication grooves 14 cools the dynamic pressure generation land 6 as in the hydraulic bearing device of the third embodiment. In this state, the lubricating oil fills up the substantially U-shaped slot 4 serving as an oil pocket. And the lubricating oil flows through a narrow gap formed between the outer bearing surface of the dynamic pressure generation land 6 and the outer peripheral surface of the rotating shaft S. Then, the lubricating oil is drained into the drainage grooves 5. Also, the lubricating oil flows through a narrow gap formed between bearing surfaces of the drainage lands 15 and the outer peripheral surface of the rotating shaft S. Then, the lubricating oil is drained into the drainage holes 13. Finally, the lubricating oil is drained into the oil terminal provided outside through the drainage passage 10, the drainage grooves 11 and the main drainage passage D.

The drainage land 15 to which the drainage hole 13 opens improves the load characteristics of the hydraulic bearing device. In all the other respects, the operation and effect of the fourth embodiment are substantially identical to those of the third embodiment.

[Fifth embodiment]

A hydraulic bearing device according to a fifth embodiment of the present invention will now be described.

Figure 9:
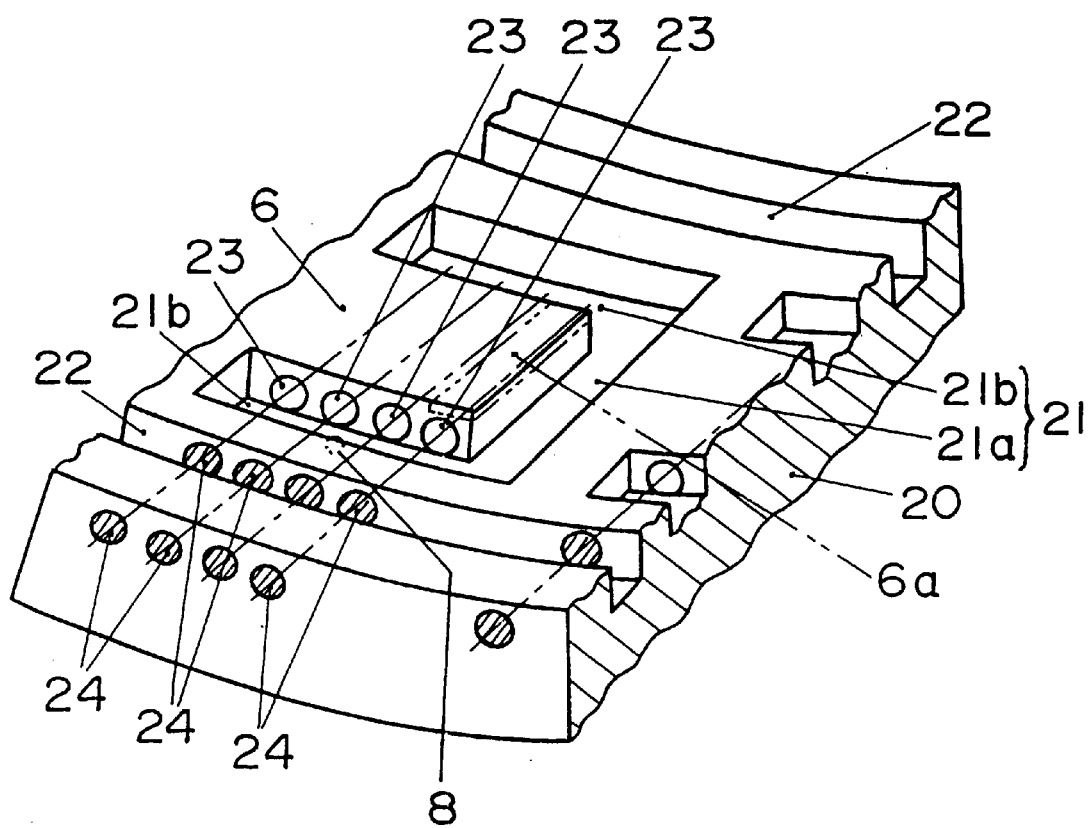
FIG. 9 is a partial perspective view of a bearing metal of a hydraulic bearing device according to a fifth embodiment of the present invention.

Although the bearing metal 1 according to the first to fourth embodiments has a double layer construction composed of the inner sleeve 2 and the bearing casing 3, a bearing metal 20 of the hydraulic bearing device according to the fifth embodiment is made of a single member as illustrated in FIG. 9. This is because the overall precision of the hydraulic bearing device is enhanced by omitting the process of press-fitting or shrinkage-fitting the inner sleeve 2 into the bearing casing 3.

The cylindrical bearing metal 20 is provided with an appropriate number (e.g. four) of substantially U-shaped grooves 21 (i.e. pockets) arranged in the circumferential direction and equally distant from each other. Each of the grooves 21 is composed of a connecting portion 21a that extends in the axial direction of the rotating shaft S and leg portions (parallel portions) 21b that extend from respective ends of the connecting portion 21a in the circumferential direction in which the rotating shaft S rotates. Furthermore, drainage grooves 22 are formed in an inner peripheral surface of the bearing metal 20. The substantially U-shaped groove 21 is formed between the drainage grooves 22 which extend in the circumferential direction in parallel with the leg portions 21b. The substantially U-shaped grooves 21 and the drainage grooves 22 are formed by cutting the bearing metal 20 from the inner surface thereof to the predetermined depth.

A quadrilateral bearing surface area surrounded by the substantially U-shaped groove 21 constitutes the dynamic pressure generation land 6.

As is the case with the hydraulic bearing device of the third embodiment, the radially extending oil supply hole 8 is formed in the bearing metal 20. The oil supply hole 8 opens to a bottom surface of on of the leg portions 21b of the substantially U-shaped groove 21 at an appropriate location (e.g. at a center of the leg portion 21b).

The dynamic pressure generation land 6 is provided with an appropriate number (e.g. four as illustrated in FIG. 9) of communication holes 23 that connect the leg portions 21b of the substantially U-shaped groove 21 with each other. The communication holes 23 are arranged in the circumferential direction, equally distant from each other and parallel to each other.

The communication holes 23 passes through an end surface of the bearing metal 20, the drainage groove 22 and one of the leg portions 21b by drilling, thus penetrating the dynamic pressure generation land 6 in the axial direction. Where the communication holes 23 penetrate a section of the bearing metal 20 other than the dynamic pressure generation land 6, they are sealed by plugs 24.

In the aforementioned bearing metal 20, as is the case with the communication grooves 14 of the third embodiment, lubricating oil flows from the oil supply hole 8 into the substantially U-shaped groove 21 which serves as an oil pocket, thus filling up a space defined by the substantially U-shaped groove 21 and the outer peripheral surface of the rotating shaft S. The lubricating oil then flows from one to the other of the leg portions 21b through the communication holes 23. Thereafter, the lubricating oil flows through a narrow gap formed between the outer bearing surface area and the outer peripheral surface of the rotating shaft S, and reaches the drainage grooves 22.

In the fifth embodiment, the lubricating oil achieves the same operation and effect an in the third embodiment, including those achieved by the construction wherein the dynamic pressure generation land 6 is provided with the stepped portion 6a or reduced in thickness gradually toward the free end portion thereof.

While the present invention has been described with reference to preferred embodiments thereof, it is to be understood that the invention is not limited to the disclosed embodiments or constructions. On the contrary, the invention is intended to cover various modifications and equivalent arrangements included within the spirit and scope of the appended claims.

What is claimed is:

1. A hydraulic bearing device comprising:

a rotating shaft;

a cylindrical bearing metal that supports the rotating shaft;

a pocket formed in an inner peripheral surface of said bearing metal;

a dynamic pressure generation land defined by said pocket;

a fluid pressure source provided outside of said bearing metal;

a fluid flowing space formed in said dynamic pressure generation land; and an oil supply hole that supplies fluid from the fluid pressure source to said pocket and said fluid flowing space so that thermal expansion of the dynamic pressure generation land is inhibited;

wherein said dynamic pressure generation land is provided with a stepped portion for increasing a clearance between said dynamic pressure generation land and said rotating shaft.

2. The hydraulic bearing device according to claim 1, wherein said pocket is interposed between drainage grooves for fluid overflowing from said pocket.

3. A hydraulic bearing device comprising:

a rotating shaft;

a cylindrical bearing casing;

a cylindrical inner sleeve fitted into said bearing casing and arranged to support said rotating shaft;

a pocket formed by a slot extending from an outer peripheral surface to an inner peripheral surface of said inner sleeve;

a dynamic pressure generation land defined by said pocket;

a fluid supply source provided outside said bearing casing;

a fluid flowing space formed between said dynamic pressure generation land and an inner peripheral surface of said bearing casing; and an oil supply hole formed in said bearing casing and located to supply fluid from the fluid supply source to said pocket and said fluid flowing space so that thermal expansion of the dynamic pressure generation land is inhibited;

wherein said pocket is composed of at least two portions parallel to a direction in which said rotating shaft rotates and another portion that connects the two parallel portions with each other; and wherein said fluid flowing space communicates with said pocket formed by removing a certain portion of the outer peripheral surface of said inner sleeve, said space allowing said dynamic pressure generation land to be formed in a plate shape with one side supported by an inner peripheral surface of said inner sleeve.

4. The hydraulic bearing device according to claim 3, wherein said pocket is interposed between drainage grooves for fluid overflowing from said pocket, said drainage grooves being formed in the inner peripheral surface of said inner sleeve.

5. The hydraulic bearing device according to claim 3, wherein said oil supply hole opens to the other portion of said pocket.

6. A hydraulic bearing device comprising:

a rotating shaft;

a cylindrical bearing casing;

a cylindrical inner sleeve fitted into said bearing casing and arranged to support said rotating shaft;

a pocket formed by a slot extending from an outer peripheral surface to an inner peripheral surface of said inner sleeve;

a dynamic pressure generation land defined by said pocket;

a fluid supply source provided outside said bearing casing;

a fluid flowing space formed between said dynamic pressure generation land and an inner peripheral surface of said bearing casing; and an oil supply hole formed in said bearing casing and located to supply fluid from the fluid supply source to said pocket and said fluid flowing space so that thermal expansion of the dynamic pressure generation land is inhibited;

wherein said dynamic pressure generation land is provided with a stepped portion for increasing a clearance between said dynamic pressure generation land and said rotating shaft.

* * * * *